United States Patent [19]
Luciani et al.

[11] Patent Number: 5,940,627
[45] Date of Patent: Aug. 17, 1999

[54] USER SELECTABLE FEATURE SET FOR A FLASH ROM BASED PERIPHERAL

[75] Inventors: Luis E. Luciani, Spring; Don A. Dykes, Houston, both of Tex.

[73] Assignee: Compaq Computer Corporation, Houston, Tex.

[21] Appl. No.: 08/816,350

[22] Filed: Mar. 13, 1997

[51] Int. Cl.$^6$ .............................. G06F 12/00; G06F 13/00
[52] U.S. Cl. ...................... 395/834; 395/843; 395/497.01
[58] Field of Search .................. 395/164, 200.09, 395/200.5, 65, 704, 800, 834, 843, 497.01; 370/79, 254; 381/77; 365/185.29; 711/170; 455/436

[56] References Cited

U.S. PATENT DOCUMENTS

| | | | |
|---|---|---|---|
| 5,327,531 | 7/1994 | Bealkowski et al. | 395/164 |
| 5,390,256 | 2/1995 | Mandell et al. | 381/77 |
| 5,428,671 | 6/1995 | Dykes et al. | 379/93 |
| 5,497,373 | 3/1996 | Hulen et al. | 370/79 |
| 5,564,108 | 10/1996 | Hunsaker et al. | 395/800 |
| 5,579,522 | 11/1996 | Christeson et al. | 395/652 |
| 5,621,687 | 4/1997 | Doller | 365/185.29 |
| 5,657,448 | 8/1997 | Wadsworth et al. | 395/200.5 |
| 5,699,350 | 12/1997 | Kraslavsky | 370/254 |
| 5,712,977 | 1/1998 | Glad et al. | 395/200.09 |
| 5,737,766 | 4/1998 | Tan | 711/170 |
| 5,758,070 | 5/1998 | Lawrence | 395/200.5 |
| 5,787,285 | 7/1998 | Lanning | 395/704 |
| 5,787,345 | 7/1998 | Moon | 455/436 |

OTHER PUBLICATIONS

Intel Corporation, "Smart 5 Book Block Flash Memory Family 2, 4, 8 Mbit," Advanced Information Data Sheet, Dec. 1997, pp. 3–6, 13–25, and 36–38.

*Primary Examiner*—Hassan Kizou
*Assistant Examiner*—Nguyen Xuan Nguyen
*Attorney, Agent, or Firm*—Akin, Gump, Strauss, Hauer & Feld, L.L.P.

[57] ABSTRACT

A method and apparatus for providing a programmable device with operational parameters applicable to successive operational environments. According to some aspects, the method includes the steps of programming memory with a common operational code applicable to multiple operational environments, programming memory with a first operational environment dependent code, operating said device in a first operational environment, changing to a second operational environment, adding a second operational environment dependent code, and operating in a second operational environment. According to some aspects, the apparatus comprises a programmable device operating according to a set of operational parameters reprogrammably stored therein. The device comprises a memory having a first region containing a common operational code independent of operational environment, a programmable second region containing a first operational environment dependent code, and a programming module coupled to receive an operational environment dependent signal and to provide a programming instruction to the second region.

24 Claims, 4 Drawing Sheets

| | | |
|---|---|---|
| 1.75KB | | 0x0000ffff |
| | | 0x0000f900 |
| stack | | |
| of_vars | 4KB | |
| | | 0x0000f8ff |
| | | 0x0000e900 |
| optional features vars | | |
| cf_vars | 4.5KB | |
| | | 0x0000e8ff |
| | | 0x0000d700 |
| cellular phone vars | | |
| | 52KB | |
| | | 0x0000d6ff |
| | | 0x00000700 |
| basic features vars | | |
| | 1.75KB | |
| | | 0x000006ff |
| | | 0x00000000 |
| boot sector/common vars | | |

FIG. 5

USER SELECTABLE FEATURE SET FOR A FLASH ROM BASED PERIPHERAL

SPECIFICATION

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to electronic memory devices, and more specifically to electronic storage of parameters relating to operational environments.

2. Description of the Related Art

One of the fastest growing areas of computer technology relates to the explosive growth of modems. Modems provide direct digital communication over existing telephone lines among computers, and can allow access to the Internet, E-mails, and computer billboards, to name a few examples. Although the bandwidth of modems was originally thought to be limited to a few kilobits per second, recent advances have allowed modems to achieve speeds approaching 56 kilobits per second, although 14.4 and 28.8 kilobits per second are more common. Still other higher speeds may yet be possible, given the explosive growth in this area.

Unfortunately, standards still are evolving for some of the higher speed technologies. For example, several manufacturers have been developing modems having higher speed protocols, independent of any particular standard. Higher speed digital communications is seen as a necessity, particularly in light of the dramatic development of the Internet, yet the pace of innovation has exceeded the ability to set standards. In Europe, development of the GSM Standard is underway while in the United States, the rapid pace of technological advancement far exceeds the ability of the standard-setting entities to provide appropriate standards. Further, standards obviously cannot be developed for presently unknown technologies. Interoperability is a problem as manufacturers of modems try to create systems to allow one computer to communicate with a computer operating under a different format. For an overview of modem technology, refer to U.S. Pat. No. 5,428,671 entitled "Modem for Tight Coupling Between a Computer and a Cellular Telephone," issued Jun. 27, 1995, to Don A. Dykes, et al., which is hereby incorporated by reference.

Not only have the lack of standards encouraged independent development of incompatible communications protocols among various manufacturers within a given country, but global harmonization of communication protocols is difficult to achieve, and as consumers and businesses in one country try to take advantage of technological advances in another country having a different communication system, manufacturers of consumer and business related devices must anticipate demands for their products in a variety of potential uses.

Similar problems are also evident in other areas of technology. For example, the lack of international standards relating to cellular telephones makes it difficult for a manufacturer in one country to develop cellular products, including modems, for use by international travellers who carry such devices cross international boundaries and into different operational environments. The use of different operational environments in different countries inhibits both the ability of a manufacturer to produce a product for sale in several countries, and the development of products that can be used transported by an end-user across international boundaries. Lack of international standards relating to handshake/initialization, handoff, security, and even bandwidth use make international interoperability particularly problematic.

Various approaches to solving these problems have been advanced. For example, some devices have a number of different protocols stored in memory or storage devices, such as flash devices, and EEPROMs, floppy discs, and others. These memory and storage devices can be loaded with a protocol for a particular customer's use at the point of manufacture. Drawbacks associated with these devices, however, are known: simple ROM is not updatable; RAM is volatile, and can be expensive, DRAM must be refreshed, and SRAM requires several transistors and can be expensive; EEPROMS require high internal voltages to increase speed, or have redundant devices with consequent complexity; magnetic memory has slow access time and requires greater power. Flash memories allow for nonvolatile storage, but erasing an entire block of flash memory can result in overwriting, or overcycling limiting the useful life of the flash memory. Complete reprogramming of a device upon each change of the environment in which the device will operate can be an inefficient process.

SUMMARY OF THE INVENTION

There is a need for a method and an apparatus for providing a programmable device with operational parameters applicable to successive operational environments. The method should allow a predetermined set of features to be included for each device, minimally necessary to allow the device to operate in any environment, and then additional sets of features to be included and changed as the device is moved from one operational environment to another or is sold to an end user for use in a different operational environment. The method and apparatus of the present invention should allow the device to retain information nonvolatily when power is disconnected, yet be easily reprogrammed or additionally-programmed when taken to a new operational environment.

This and other needs are satisfied by a device and method implemented according to the present invention, wherein a method for providing a programmable device with operational parameters applicable to successive operational environments is described. According to one aspect of the invention, the method includes steps of programming a memory with a common operational code applicable to multiple operational environments. In some embodiments, the common operational code is a code minimally necessary to operate the device. According to the first exemplary embodiment, at a point of manufacture, the device memory is then programmed with a first operational environment dependent code. The code thus programmed may be a set of procedures for operating the device, or may be a pointer or header to a previously-stored set of such procedures. A user can then operate the device in the first operational environment. When the user decides to change to a second operational environment, or decides to upgrade the device to operate it with additional features, the device can be reprogrammed or additionally programmed to accommodate features necessary for the new operational environment. For example, the device can be programmed by adding a second operational environment dependent code, complete with protocols necessary for operation or with additional enhancement features. The device can then be operated in a second operational environment. The addition of the second operational environment dependent code need not overwrite the first operational environment dependent code, which in some embodiments remains within the device. Further, the second operational code need not overwrite common operational code. The second operational environment dependent code can be a set of procedures or can be a pointer or header to a second previously stored set of such procedures.

Other advantages of the present invention allow some embodiments to accommodate changing and emerging protocols as technology develops. Such accommodation allows the device to be purchased now, and remain useful as new devices and protocols develop. Thus, the device will never truly be obsolete; it can be reprogrammed simply and easily, without having to reprogram the entire embedded common operational code.

It will be recognized that the present invention is not limited by the description of various embodiments and aspects thereof, but by the claims which follow the description.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
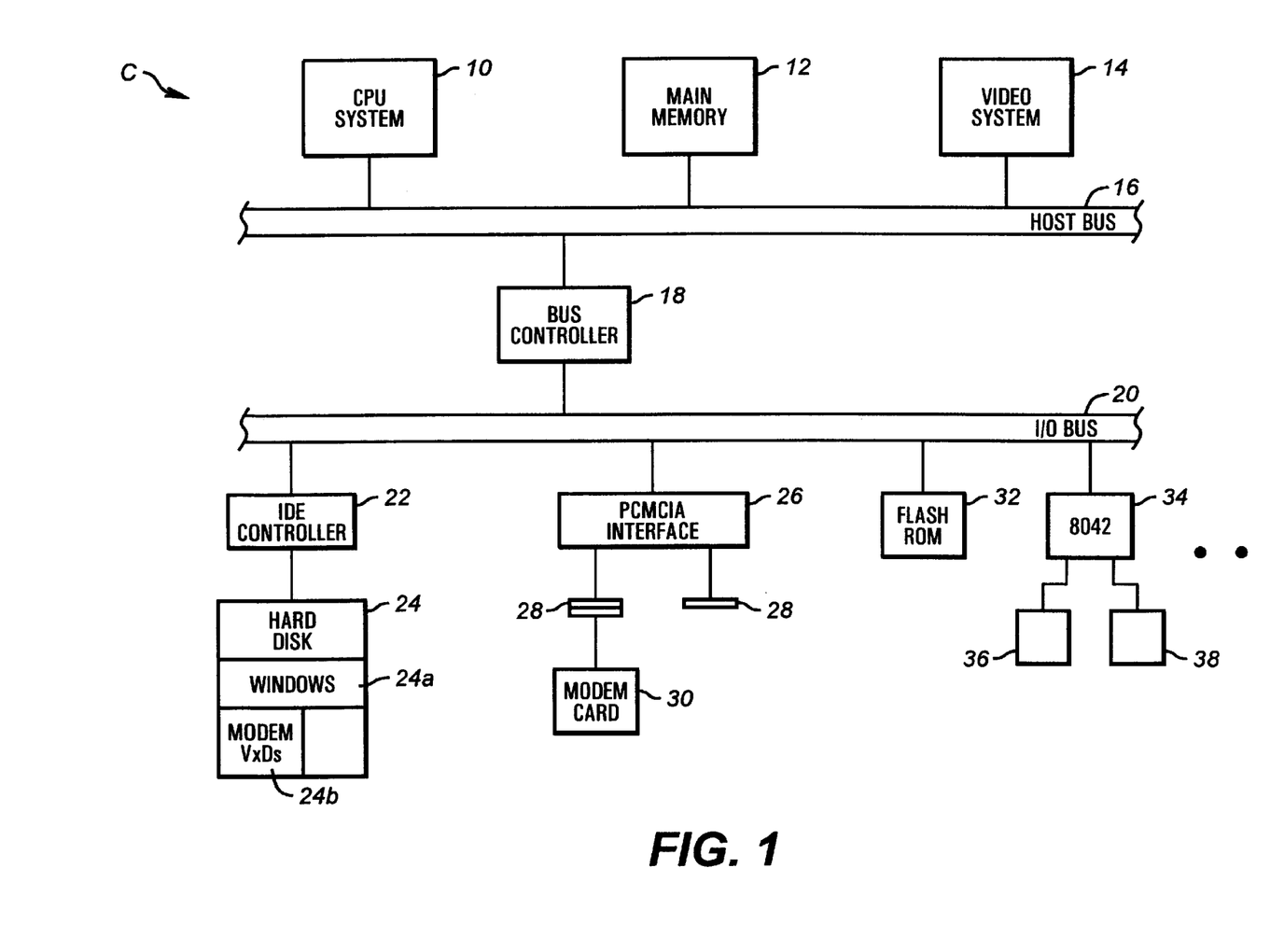
FIG. 1 depicts a typical computer system, for use in a computer network.

Referring now to FIG. 1, a simplified block diagram of a computer system C is shown, including a modem card 30. The computer system C incorporates a central processing unit (CPU) system 10 coupled to a host bus 16. The host bus functions to interface the CPU system 10 to the rest of the computer system C, including a memory array otherwise referred to as the main memory 12. The CPU system 10 may simply be a microprocessor, such as Intel Corporation's 486 or PENTIUM, or a more complete CPU system including a microprocessor, a cache controller and other components. A video system 14 is also connected to the host bus 16.

The host bus 16 is coupled to the I/O bus 20 through a bus controller 18, which is preferably compatible with the Industry Standard Architecture (ISA) or the Extended Industry Standard Architecture (EISA) bus. The exact architecture of the I/O bus 20 is not critical to the invention.

Connected to the I/O bus 20 are various components conventionally located on the system board of the computer system C. These include the read only memory (ROM) 32, which provides the BIOS and other system level instructions, and an 8042 keyboard controller 34. A keyboard port 36 and an auxiliary or pointing device port 38 are connected to the 8042 keyboard controller 34. A hard disk drive 24 is connected to the I/O bus 20 via an IDE controller 22. The IDE controller 22 contains buffer control logic and generates chip selects for IDE drives during data reads and data writes to IDE devices.

The computer system of FIG. 1 is exemplary, and numerous other computer system designs could be used. Further, the modem card 30 can be located directly on the I/O bus 20 or any other bus utilized by the computer system C, including the host bus 16. The exact location of the modem is not critical to the invention.

Figure 2:
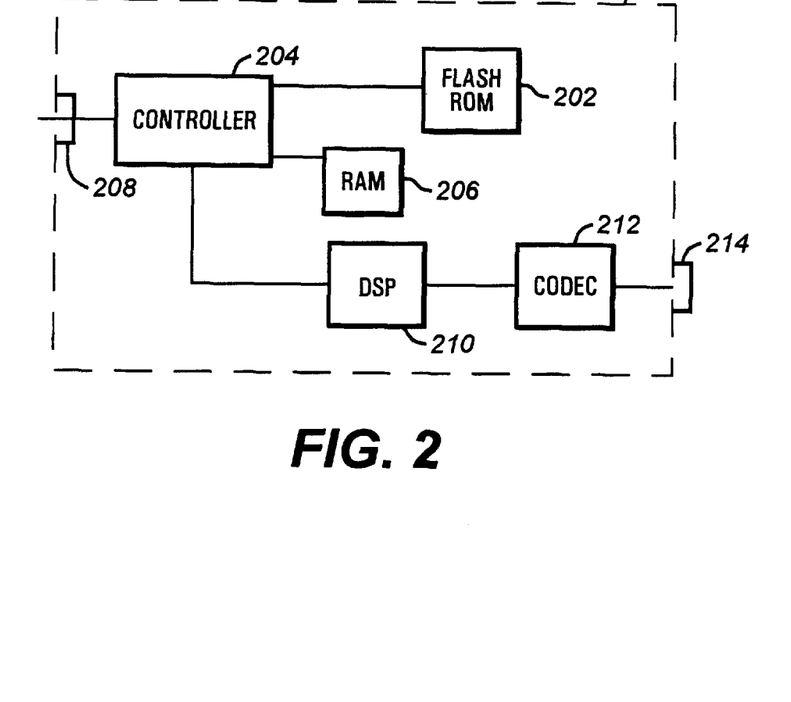
FIG. 2 depicts a typical modem.

Referring now to FIG. 2, shown is a typical data modem 200 in which a system according to the invention would be implemented.

Figure 3:
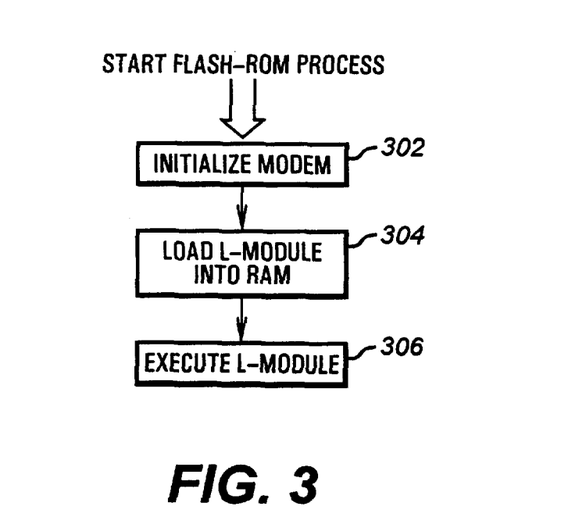
FIG. 3 depicts a sector-based flash ROM method according to one embodiment of the present invention.

Referring now to FIG. 3, a sector-based flash ROM method according to the invention is depicted. It will be apparent that the sector-based flash ROM method is presented by way of example only, and does not serve to limit the claims.

According to the method depicted in FIG. 3, in step 302 a modem 200 is initialized. Upon initialization, the modem 200 runs an execution code embedded within a flash ROM 202, within the modem 200. The execution code contains information necessary for standard operation of the modem 200. For example, the modem execution code typically contains startup and initialization code operating upon initial startup of the modem 200. Execution of the modem 200 code is performed by a modem controller 204, which is typically an embedded microcontroller, such as a MC68302 by Motorola Corporation. In normal operation, the modem controller 204 pages executable code from the flash ROM 202 into a volatile RAM 206, and executes that code out of the RAM 206. This code, referred to as sector modules, or S-modules, provides for operation of the modem 200 responsive to commands and data received from the computer system S over an interface 208, and controls a DSP 210 and CODEC 212 which connect to a phone line or cellular phone through a second interface 214. Other hardware arrangements are possible without detracting from the spirit of the invention. For example, although the modem controller 204 and the DSP 210 are shown as two devices, it is also possible to combine their functionality in a single digital signal processor.

Thus, in normal operation, the flash ROM 202 is only read from and not written to. But it is sometimes desirable to program the flash ROM 202. Such situations include to update the firmware to a more recent release, to reprogram a flash ROM 202 which has been corrupted, or to place an initial program into the flash ROM 202 in the factory.

FIG. 3 illustrates the steps taken when it is determined that the flash ROM 202 is to be reprogrammed. From step 302, the initialization routine would proceed to step 304 when, for example, the computer system S sends an "AT&&P" command to the controller 204. Similarly, after the initialization code is loaded from the flash ROM 202 into the RAM 206 and run on the controller 204, that initialization code may determine the code within the flash ROM 202 has been corrupted and must be reinstalled or that the modem specific code has never been loaded (such as in the factory), and so must be initially installed. In any case, appropriate code must first be placed in RAM 206 for allowing the controller 204 to program the flash ROM 202, so at step 304, the modem 200 loads an L-module, or loader module, into the RAM 206. The loader module contains, in one exemplary embodiment, Motorola 68000 code which is downloaded into the modem's RAM 206. Alternatively, the loader module could be permanently stored in the flash ROM 202 in the initialization code. The L-module is loaded upon the receiving of an AT&&P command, which causes the modem 200 to reboot, load the L-module, and issue a ready response. The loader module is preferably in Motorola S record format in one embodiment, and begins execution upon being loaded into the RAM 206.

In step 306, the L-module is executed by the controller 204. The L-module remains within the RAM device 206 of the modem 200, where high-speed execution is realizable. In some embodiments, the L-module serves to copy various S-modules from a source, such as a floppy disk or a remote location, directly into a flash ROM 202 associated with the modem 200. In other embodiments, copying is a two-step process, in which the L-module copies data into the RAM 206 of the modem 200 and then into the flash ROM 202. The data thus copied, in the exemplary embodiment, is an S-module, or sector module, containing Motorola 68302 code that is copied into particular sectors within the flash ROM 202 associated with the modem 200. Preferably, the L-module is not copied into or read from the flash ROM 202; only the S-modules are copied into flash ROM 202.

Although some loader modules may completely reflash the flash ROM 202, according to the invention, this is neither necessary nor preferable. Particular sectors within the flash ROM 202 are reprogrammed, while others remain as originally loaded. Because the flash ROM 202 is a non-volatile memory, the modem controller 204 operating upon subsequent uses of the modem 200, will retain information flashed into the flash ROM 204 by previous executions of various loader modules. The advantages of partially reflashing the flash ROM 202 include an ability to retain the same basic set of operational characteristics corresponding to a first set of common operational protocols and other procedures, while also allowing particular operational environment dependent characteristics or features to be newly flashed or reflashed. The advantages also include an ability to upgrade without erasing, allowing fast and convenient reconfiguration without overwriting previously flashed data. This is particularly important where a user has defined certain conditions and now desires an upgrade, since the previously stored user-defined conditions can remain protected.

In one embodiment, the flash ROM 202 contains physical sectors that can be reflashed individually or in groups. A physical sector is the minimum range of addresses which can be erased with one flash erase sector command. Various flash ROM 202 sectors are collectively mapped to logical sectors by the L-module. A logical sector is a grouping of one or more physical sectors which must be erased or rewritten together. The reflashing of the flash ROM 202 occurs according to the logical sectors as mapped to physical sectors within the flash ROM 202. The L-module converts logical sectors into physical sectors. Logical sector boundaries fall on physical sector boundaries. Only the L-module is aware of the physical sectors. In other words, the loader module contains code identifying logical sectors to be reflashed, that are then mapped into physical sectors and reflashed.

It will be apparent that, since the loader module is preferably not copied into the flash ROM 202 of the modem controller but remains only in RAM 206, the loader module is stored volatily and will be erased when the power is removed from the modem. This is generally acceptable, because when one must reflash the flash ROM 202, the provider of the code that will be flashed as S-modules can simultaneously provide the L-module for loading.

But this reflects a deeper aspect of the system according to the invention. Rather than simply increase the flash ROM size to accommodate additional features, or to include the L-module, instead provision is made for "swapping out" environment dependent modules.

When the modem 200 is to be operated within the same operational environment in which the modem 200 was previously operated, no reloading of code is necessary. Additionally, when the modem 200 is to be transferred to a second operation environment, only a portion of the code need be replaced. This fact highlights a significant advantage with the exemplary embodiments over ROM, EPROM, EEPROM and other nonvolatile technology of the prior art, in that only information particularly relevant for operation of the particular device coupled to the modem controller in the new environment need be stored at all. Rather than rewriting the entire memory when a new operation environment is encountered, only a portion thereof need be rewritten. This allows user-defined or version-specific information to remain in the device. Loader modules, in some embodiments, contain code written specifically for a particular change from a first predetermined operational environment to a second predetermined operational environment, allowing a user of the modem to reflash only those portions that are necessary to accommodate the change in operational environment.

Figure 4:
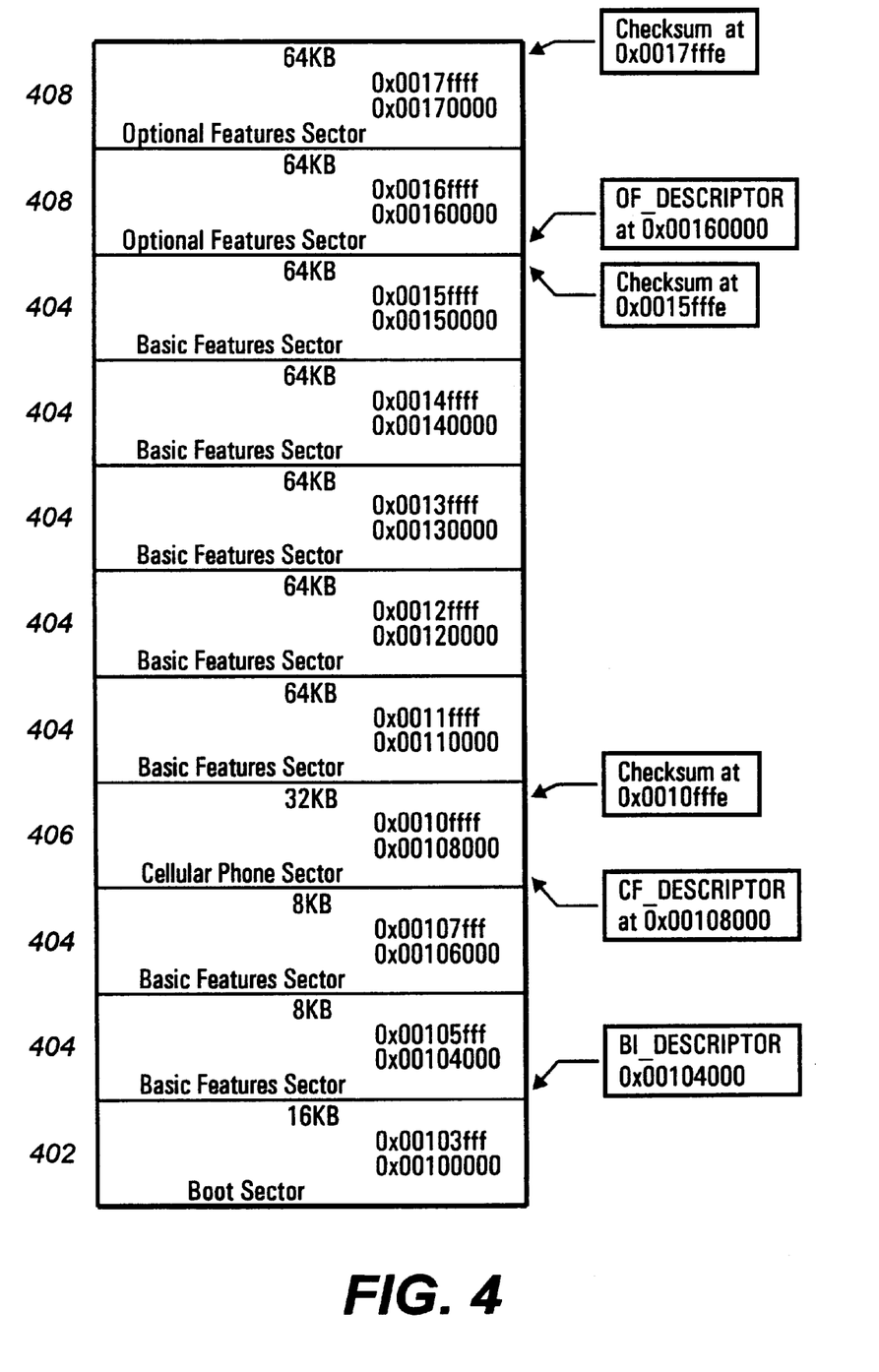
FIG. 4 depicts a flash ROM device according to one embodiment of the present invention.

Referring now to FIG. 4, and as stated previously, the flash ROM 202 in one embodiment is divided into several logical sectors. Each of these logical sectors is mapped within the loader module to one or more physical sectors of the flash ROM 202. One logical sector of the flash ROM 202 device is a boot sector 402. The boot sector 402 contains the minimum code necessary to allow the modem 200 to be reflashed. It also contains additional code which is not likely to change to allow for maximum utilization of the boot sector 402. This sector cannot be erased without external equipment if it has been protected by the factory. Therefore, the boot sector 402 locks to prevent reflashing, and can only be reprogrammed within the factory using equipment not available to the typical modem 200 user. Although a particular loader module may overwrite other areas of the flash ROM 202, and will do so if other areas of the flash are completely empty, the boot sector 402 generally remains as originally programmed. The boot sector 402 automatically begins execution upon rebooting of the device and performs initialization on the device, as well as reloading flash when possible.

It will be apparent that protecting the boot sector 402 can be particularly important during a subsequent execution of a loader module which has been loaded to RAM 206. If power is lost during a block-erase and before rewrite of various sectors, at least the boot sector 402 will remain intact, and can be used to restart operation. Such a boot sector 402 can also be used to perform various test operations, such as perform a checksum on the remainder of the flash ROM 202, minimally initialize the system, and creating jumps to other areas of memory. Examples of boot block flash memories include the Intel 28F001BX boot-protected memory.

A group of basic feature sectors 404 contains all the basic data, facts, and telephone features normally associated with the modem 200. For example, in one embodiment, the basic feature sectors 404 contains a modem engine written by R. Scott & Associates, allowing basic operation of the modem 200. A user can upgrade or downgrade the basic features sector 404 using different releases of the modem 200 firmware.

A third logical sector is a cellular phone sector 406, containing support for one or more cellular phones. The user can change the contents of the sector to support another phone or group of phones. The cellular phone sector 406 contains information specific to a particular operational environment including all the features of cellular phone use.

A fourth group of logical sectors of the modem 200 are the optional feature sectors 408, which can contain one or more optional features if so programmed. These generally include non-mainstream items such as MMP10, MMP, CDPD modules or DSVD combined with V.80 support, for example.

As stated previously, to provide a higher speed loading, the L-module can copy S-modules into RAM 206, and then from RAM 206 into flash ROM 202. In other embodiments, the L-module copies the S-sectors directly into the flash ROM 202. Either embodiment provides high speed reconfiguration of the device according to a particular operational environment. In some embodiments, the loader module loads a predetermined number of data S-records into the modem's RAM 206 or directly into the modem's flash ROM 202. In other embodiments, the S-records contain a "terminator" S-record (type S7, S8 or S9). However, in either embodiment, upon termination of the loader module, the modem controller 204 immediately begins execution of the newly downloaded code. Because the boot sector 402 is also contained within the flash ROM 202, this newly downloaded code may include boot up information.

After completion of the loading, the modem 200 reboots. Upon rebooting, instructions within the boot sector 402 of the flash ROM 202 are executed. Preferably, to facilitate calls between modules in the various sectors and to permit easy addition of modules in the various sectors, the code modules in each sector are implemented with headers that form a linked list. For example, the first address in the first basic features sector 404 is loaded with a structure such as:

```
typedef struct T_BI_DESCRIPTOR
    {
    unsigned short              signature;
    unsigned short              build_number;
    BASIC_INTERFACE_RECORD*     jump_table;
    const char*                 signature_verbose;
    struct T_BI_DESCRIPTOR*     next_struct;
    }BI_DESCRIPTOR
where:
    typedef struct T_BASIC_INTERFACE_RECORD
    {
    int (*data1)
    int (*data2)
    .
    .
    .
    int (*function1)
    int (*function2)
    .
    .
    .
    } BASIC_INTERFACE_RECORD;
```

Referring to these structures, the signature corresponds to a feature designation, such as none (for a null record), DSVD, CDPD, V.80, answering machine, test code, Motorola phone, Ericsson phone, Nokia phone, basic features, etc.; build number is essentially a version number; and signature_verbose essentially points to a text description of the module. Referring to jump_table, this is understood to provide entry points for the features of this module. Referring to next_struct, this points to the next of the basic module headers, if any. The optional features sectors 408 and the cellular phone sector 406 also include similar headers forming linked lists.

On startup, the boot code can scan the other three sectors, gathering the information from the linked lists into the RAM 206. The three sectors then have access to the functions and data of the other sectors through these linked lists.

As noted, a linked list of header points to areas of the flash ROM 202 containing information necessary for operation of the modem 200. Of note, some of these sectors of the flash ROM 202 may have been reprogrammed by the loader module, while others may not have been. In some embodiments, the final header in the groups of sectors link list points to a void or to an invalid address within the flash ROM 202, for example, by setting next_struct to null. In some embodiments, features can be added by programming a yet unprogrammed area of the flash ROM 202, providing a header, and placing the header pointing to the newly programmed sections of ROM in the link list. Various error correction and detection algorithms are used in different embodiments, and will be apparent to one of ordinary skill upon reference to the description.

FIG. 4 illustrates the flash ROM 202 sector map showing multiple physical sectors corresponding to each of the four logical sectors, according to one embodiment of the present invention. FIG. 4 also illustrates that the physical sectors corresponding to each of the logical sectors need not be consecutive. According to one embodiment, the flash ROM 202 comprises a linked list of addresses pointing to headers of regions in memory storing functional code. Upon execution of the code containing the linked list of addresses, each of the various features for which the device has been programmed is loaded from the functional code. For example, the boot sector 402 occupies 16KB of memory within the flash ROM 202. The logical boot sector 402 is therefore mapped to the first 16KB of the flash ROM 202. When initialized, the boot sector 402 boots the modem 200. The logical basic features sector 404 is also mapped to physical memory within the flash ROM 202, but the physical memory containing the physical basic features sectors is not consecutive. The logical basic features sectors 404 map to several blocks of physical memory. The physical memory contains a linked list of addresses pointing to headers of regions in memory storing functional code. Upon execution of the code containing the linked list of addresses, each of the various basic features for which the device has been programmed is loaded from the functional code. Similarly, the cellular phone sectors 406 map to several blocks of physical memory. Again, the physical memory contains a linked list of addresses pointing to headers of regions in memory storing cellular phone related functional code, and upon execution of the code containing the linked list of addresses, each of the various cellular phone features for which the device has been programmed is loaded from the functional code. Similarly, the optional features sectors 408 map to several blocks of physical memory. The physical memory contains a linked list of addresses pointing to headers of regions in memory storing optional features related functional code. Upon execution of the code containing the linked list of addresses, each of the various optional features for which the device has been programmed is loaded from the functional code.

The nonconsecutive nature of the physical memory highlights an additional advantage of using partitionable memory; particular regions of memory can be erased more easily than with EPROM.

As stated previously, mapping from the logical sectors to the physical sectors is accomplished within the L-module. Data is reflashed into the physical sectors of the modem by the L-module, which can specify one or more logical or physical sectors for reflashing.

Figure 5:
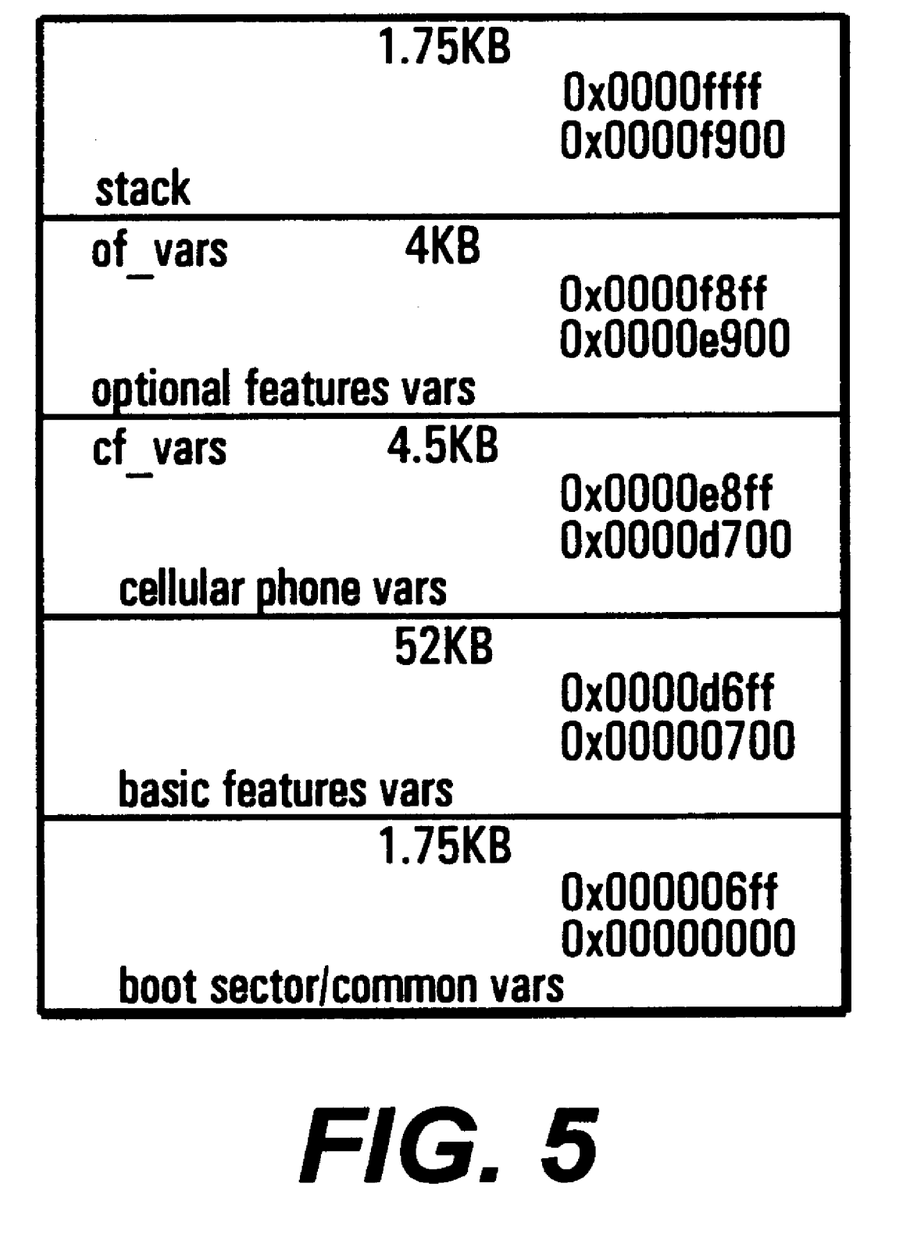
FIG. 5 depicts a RAM section map of a RAM device according to one embodiment of the present invention.

Referring now to FIG. 5, a RAM section map of the RAM 206 according to one embodiment of the present invention is depicted. The loader module would be loaded by the boot code from the boot sector 402 into a portion of this RAM 206 to be executed out of the RAM 206. As illustrated in FIG. 5, a stack 502, an optional features variable section 504, a cellular phone variable section 506, a basic features variable section 508, and a boot sector/common variables section 510, exist within the RAM 206. These sections allow loading and operation of the various flash ROM variables. During operation, each of the flash ROM sections can be run directly out of the flash ROM 202, or could be copied into RAM 206 for quicker operation. Because the various features of the device are stored in the flash ROM 202, the RAM 206 can be smaller if the code is run directly from the flash ROM 202.

By providing four logical sector types, and dividing between those along sector boundaries, it will be appreciated that the modem 200 can reprogram any one of those four logical sectors without affecting the remainder. Further, by providing the linked list structure in each logical sector, no recalculation of entry points is necessary for the remaining sectors. These features together allow the system according to the invention to have its volatile memory reprogrammed only in part when modem firmware is updated, when a user changes to a different make or model of cellular phone, when a user changes countries, or when a user changes advanced features. Thus, a device according to the invention can be programmed according to a first operational environment, used, then reprogrammed for a second operational environment without altering common code, and then used in the second operational environment. It will be appreciated that flash ROM and sectored non-volatile memory can be similarly used in other applications than a modem according to the invention. Further, it will be appreciated that the loader could execute on the processor of the computer system S, loading the executable code into the flash ROM 202 remotely.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for providing a programmable device having sectored, solid state memory that is non-volatile with operational parameters applicable to successive operational environments, said method including the steps of:

programming the memory with a common operational code applicable to multiple operational environments;

programming the memory with a first operational environment dependent code;

operating said device in a first operational environment using the first operational environment dependent code;

changing to a second operational environment;

programming memory with a second operational environment dependent code without reprogramming the memory containing the common operational code; and operating in the second operational environment using the second operational environment dependent code.

2. The method of claim 1, wherein the first and second operational environments are country-specific operational environments.

3. The method of claim 1, wherein the first and second operational environments are communication device specific operational environments.

4. The method of claim 1, wherein the programmable memory is a flash ROM for receiving operational codes.

5. The method of claim 4, wherein the programmable device further contains a RAM, the flash ROM having a boot sector with boot code for loading a loader module into RAM, wherein the loader module loads said code having at least said first operational environment dependent code into the flash ROM.

6. The method of claim 4, wherein the flash ROM is programmable by an L-module.

7. The method of claim 1, wherein at least one of the first and second operational environment dependent codes allows the use of different external devices coupled to said device.

8. The method of claim 1, further including the step of removing at least a portion of the first operational environment dependent code before said step of programming memory with a second operational environment dependent code.

9. A programmable device operating according to a set of operational parameters reprogrammably stored therein, the programmable device comprising:

a non-volatile memory having:

a first region containing a common operational code independent of operational environment; and a programmable second region containing a first operational environment dependent code; and a programming module, coupled to receive an operational environment dependent signal and to provide a programming instruction to the second region in response without reprogramming the first region.

10. The programmable device of claim 9, wherein the first and second operational environments are country-specific operational environments.

11. The programmable device of claim 9, wherein the first and second operational environments are device-specific operational environments.

12. The programmable device of claim 9, wherein the programmable memory is a Flash ROM for receiving operational codes.

13. The programmable device of claim 12, wherein the flash ROM is programmable from a loader module.

14. The programmable device of claim 9, further containing a RAM, the flash ROM having a boot sector that loads a loader module into RAM, wherein the loader module loads second operational environment code into the flash ROM.

15. The programmable device of claim 14, wherein the other memory region resides within the flash ROM.

16. The programmable device of claim 9, wherein at least one of the first and second the operational environment dependent codes provide for different external devices coupled to said device.

17. The programmable device of claim 9, wherein the programmable device is a modem further comprising:

a modem controller executing said codes; and a DSP for processing data from the modem controller and sending the processed data to an external device.

18. The programmable device of claim 17, wherein the external device is a cellular phone.

19. The programmable device of claim 17, wherein said modem controller and said DSP are implemented as two separate devices.

20. A flash ROM for operating a modem engine, containing:

a first region having a common operational code independent of operational environment; and a programmable second region containing a first operational environment dependent code, wherein the operational code includes calls to the second region, and wherein said second region has entry points that allow the second region to be reprogrammed with second operational environment dependent code without reprogramming the first region.

21. A system for reprogramming a reprogrammable device for changed operational conditions comprising:

a computer with a storage device, a processor, and an interface for the reprogrammable device;

said reprogrammable device, wherein said reprogrammable device includes a non-volatile memory containing common code and first operational environment code;

a loader routine for programming the non-volatile memory with second operational environment code without reprogramming the non-volatile memory's common code; and a controller coupled to the interface and said reprogrammable device for receiving and executing the loader routine.

22. The system of claim 21, wherein said controller is included in the reprogrammable device.

23. The system of claim 21, wherein said controller is included in the processor.

24. A magnetic medium storing a readable set of instructions executable by a computer system, the computer system including a computer with a storage device, a processor, and an interface for a reprogrammable device, the instructions containing a loader routine for programming the non-volatile memory with a second operational environment code without reprogramming the non-volatile memory's common code, the reprogrammable device containing a controller for receiving and executing the loader routine and a non-volatile memory containing common code and first operational environment code, such that when the magnetic medium is executed by the computer system the reprogrammable device is reprogrammed for changed operational conditions.

* * * * *